United States Patent [19]

Field et al.

[11] Patent Number: 4,981,398
[45] Date of Patent: Jan. 1, 1991

[54] DUST SUPPRESSANT FOR MINERALS

[75] Inventors: John R. Field, West Yorkshire, England; Geoffrey S. Gagen, Oakville, Canada

[73] Assignee: Allied Colloids Ltd., England

[21] Appl. No.: 329,656

[22] Filed: Mar. 28, 1989

[30] Foreign Application Priority Data

Mar. 28, 1988 [GB] United Kingdom ................. 8807443
Apr. 26, 1988 [GB] United Kingdom ................. 8809857

[51] Int. Cl.$^5$ .......................... C09K 3/22; C09K 17/00
[52] U.S. Cl. ...................................... 405/264; 299/12; 252/88
[58] Field of Search ................... 405/263, 264; 299/12; 252/8.554, 88; 166/295, 305.1

[56] References Cited

U.S. PATENT DOCUMENTS

| 3,520,141 | 7/1970 | Routson | 405/264 |
| 3,677,014 | 7/1972 | Stout et al. | 405/264 |
| 4,366,194 | 12/1982 | Pilny et al. | 427/385.5 |
| 4,417,992 | 11/1983 | Bhattacharyya et al. | 252/88 |
| 4,474,903 | 10/1984 | Robertson et al. | 523/130 |
| 4,617,132 | 10/1986 | Dalrymple | 405/263 X |
| 4,637,759 | 1/1987 | Owa et al. | 405/270 |
| 4,650,598 | 3/1987 | Roberts et al. | 299/12 X |
| 4,669,920 | 6/1987 | Dymond | 166/294 X |
| 4,690,589 | 9/1987 | Owa | 405/263 |
| 4,712,617 | 12/1987 | Kocsis | 166/270 |
| 4,882,069 | 11/1989 | Polnoreski | 210/734 X |

FOREIGN PATENT DOCUMENTS 60-004587 1/1985 Japan .................................. 405/263

Primary Examiner—Dennis L. Taylor
Assistant Examiner—Arlen L. Olsen

[57] ABSTRACT

Oil dispersions of water-soluble anionic polymer particles and water-soluble cationic polymer particles are mixed with water to form an aqueous solution containing one polymer in an amount in the range 10 to 40 mole % (moles of anionic groups) and the other polymer in an amount in the range 60 to 90 mole %. The solution is immediately applied to a surface to suppress release of dust from that surface.

16 Claims, No Drawings

DUST SUPPRESSANT FOR MINERALS

This invention relates to dust suppression and is particularly suitable for the prevention of dust on mine-haulage roads and other dusty materials.

Air-borne dust can be a serious problem in mining and mineral processing operations causing both environmental and health hazards.

Air-borne dust can originate from many sources for example stock piles, unmade haulage roads and for minerals in transit in open vehicles such as rail cards.

Emission of this dust can usually be prevented by spraying the material with water, but this has only a temporary effect which is very short lived in warm, dry climates, as the water evaporates quickly and dust is again free to become air born. It is know to apply polymers and other materials in the aqueous solution to bind the dust particles after the water has evaporated and prevent dust loss.

In U.S. Pat No. 3,677,014 water-swellable polyacrylamide in a liquid carrier vehicle or in the dry form is applied to the surface of fine particulate material to stabilise it and prevent dust formation. The polymer has a molecular weight between 100,000 and about 4,000,000, usually between 1,000,000 and 3,000,000. The polymer is best applied from solution but the solution is liable to be viscous and so can be difficult to handle and apply effectively. The polymers are relatively expensive so that their use is often uneconomical. After initial application or after rewetting the surface may become sticky or slippery and is therefore likely to result in unsatisfactory or even dangerous properties.

In DE No. 2912326, a polyelectrolyte based additive is used to aid dust suppression by wetting with water. The polymers may be anionic or cationic and may often be acrylic polymers for example, formed from acrylamide or derivatives or acrylic acid preferably having molecular weights of 100,000 up to 10,000,000, preferably about 1,000,000. Anionic polymers (e.g. 70:30 acrylamide:acrylic acid copolymers) are shown to be less satisfactory than cationic polymer (e.g. 75:25 acrylamide:dimethyl amino ethyl methacrylate).

In U.S. Pat No. 4,417,992, water swellable crosslinked polyacrylamide gel particles are applied from a dispersion in oil to roads, mines and mineral piles to bind dust particles. The polyacrylamide is optionally formed by copolymerising e.g. acrylic acid. Such dispersions are very expensive and their application releases undesirable organic solvent into the environment.

Suppression of dust on mine haulage roads require very strong binding of the dust particles because of the severe crushing and abrasion of the surface by the heavy vehicles using the roadway. Strong binding can be obtained by treatment with a solution of a high molecular weight anionic polymer, followed immediately by a solution of high molecular weight cationic polymer (or vice versa). Co-precipitation of the polymers forms an insoluble polymer which binds the particles strongly. However this type of treatment would be expensive as the two components each require their own make up and application equipment. At present, therefore, dust suppression systems tend to be relatively ineffective after drying, or, if they rely upon the presence of a polymeric binder, they tend to incur difficulties in application and may be too expensive for practical use and/or give stickiness and/or other properties rendering them undesirable for use on, for example dirt tracks. A particular problem arises in transportation of any goods having a content of fine, particulate material since the torsional stress caused by movement, for example in rail cars, breaks the brittle coatings formed by presently available dust-suppressant compositions. In order to overcome this problem a dust suppressant which forms a flexible coating is required to resist the torsional stress.

In U.S. Pat. No. 4,690,589 and U.S. Pat. No. 4,633,759 an aqueous solution of a mixture of a water soluble anionic polymer and a water-soluble nonionic polymer is applied to soil and caused to precipitate below the surface of the soil to act as a sealant. By controlling the pH and/or salt content of the solution the depth at which the polymer precipitates is determined. Precipitation is apparently brought about by interaction of the polymer with ions in the soil.

In U.S. Pat. No. 3,520,141 hydrolysed polyacrylamide and multivalent metal ions are applied separately to soil. The polymer is crosslinked in situ by the metal ions and acts as a soil sealant.

In U.S. Pat. No. 4,366,194, U.S. Pat. No. 4,712,617 and U.S. Pat. No. 4,474,903 polymers are applied to soil and covalently crosslinked in situ by reaction with a chemical crosslinker to create a soil sealant.

The invention comprises a method for stabilisation of a surface of finely divided particulate material comprising combining particles of anionic, water soluble, polymer dispersed in a non-aqueous liquid, particles of cationic, water soluble polymer dispersed in a non-aqueous liquid and sufficient water to provide a solution of the cationic and anionic polymers, and substantially immediately applying the solution to the surface, wherein the proportions of anionic and cationic polymers are 10 to 40 or 60 to 90 mole % of anionic polymer and 90 to 60 or 40 to 10 mole % cationic polymer.

In this specification the term mole % refers to moles of cationic or anionic groups.

The dispersed cationic and anionic polymers can be mixed in the absence of water, as a substantially anhydrous polymer-in-oil dispersion, and the water can be mixed with this at the time of application to the dusty surface. The polymers can be presented in a single composition. Alternatively separate dispersions (either substantially anhydrous or containing some water) and water may be blended at the time of application. It is important that, until the time of application, the two types of polymers are not allowed to contact each other in the presence of water as they may otherwise precipitate prematurely.

This combination of anionic and cationic polymers has been found to produce results which are surprisingly superior to those obtained with previous dust suppression compositions, and binds dust particles very strongly by co-precipitation to give an insoluble polymer which continues to bind the particles even after drying, thus producing substantially longer protection. In addition the coating produced is more flexible than known dust suppressant compositions and is effective for transportation of minerals for example in open rail cars. The method also overcomes the problems of expense which would arise if the cationic and anionic polymers were applied separately and sequentially.

Equimolar amounts give a precipitate which cannot be applied to the finely divided particulate material. Using the composition of the present invention this problem is overcome and an excess of one monomer over the other produces a viscous solution which can be diluted with water immediately before application.

The polymers used can be copolymers or homopolymers and are preferably formed from ethylenically unsaturated monomers. The polymers are preferably of high molecular weight, generally 1,000,000 to 20,000,000. However, the composition is also effective if one of the polymers is of moderate molecular weight or from 50,000 to 1,000,000.

The anionic copolymers used in the method are formed from at least 20%, often at least 50% by weight water soluble ethylenically unsaturated anionic monomer, generally at least 70% by weight and sometimes more than 90 or 95% by weight anionic monomer. Homopolymers are sometimes preferred.

Ethylenically unsaturated monomers that may be used are for example carboxylic, sulphuric, sulphonic or phosphoric acid ethylenically unsaturated monomers, generally sulphonic or carboxylic acid monomers or derivatives. Acrylic monomers are preferred. Examples of carboxylic acids are maleic, itaconic, crotonic, more preferably acrylic and methacrylic acid. Sulphonic acids that may be used are for example acrylamido alkyl sulphonic acids such as 2 acryamido 2 methyl propane sulphonic acid, or allyl sulphonates. The units derived from the anionic monomers are generally present in the form of a water soluble metal, amine or ammonium salt, preferably an alkali metal salt, more preferably a sodium salt.

Suitable cationic polymers include those formed of amino alkyl derivatives, eg dialkyl amino alkyl derivatives of acrylamide, methacrylamide, acrylic acid or methacrylic acid. These derivatives are preferably quaternised. Generally quaternisation or other derivative formation steps are conducted on the monomer, before polymerisation, but they may be conducted on the polymer itself. The cationic polymer may also be a homopolymer or may be a copolymer having the desired cationic properties. For instance it may be a copolymer of a cationic monomer with a nonionic monomer such as acrylamide or methacrylamide. Usually the cationic polymer is formed from at least 20% by weight cationic monomer, often at least 40 or 50% by weight.

It is generally preferred that the anionic polymer is present in a larger molar amount than the cationic polymer. In the preferred process the proportion of anionic polymer is from 60 to 95% by weight of total polymer.

It is essential that the composition should remain substantially non-aqueous in order that the two forms of polymers do not interact with one another in the liquid dispersion.

The polymer may be made by any conventional polymerisation technique to the desired molecular weight. The most convenient method is reverse phase polymerisation. Alternatively the polymer may be made by gel polymerisation and then comminuted and dispersed in oil.

The non-aqueous dispersion of anionic and cationic polymers may then be blended in the appropriate amount and the composition supplied to the user for dilution with water immediately prior to application. Alternatively, the anionic and cationic polymeric dispersions may be supplied separately for mixture and dilution immediately prior to use. The solution may be painted or poured onto the surface but is generally sprayed. The polymer is generally applied to the surface at a rate of 5 to 100 g of dry polymer/m$^2$.

The invention is useful for dust suppression on a wide range of surfaces of particulate material. Since the bonding achieved is very strong and relatively flexible after drying it is particularly suitable for unmade haulage roads and may also be used as a stock pile sealant. The invention is especially valuable for the suppression of dust on moving surfaces, for instance as a rail car sealant and for other transportation means and also on dirt roads and other dirt tracks, the particulate material being soil, sandy soil or other particulate surface. For instance it may be of coal, iron or other metal ore, china clay or other clay, cement or lime.

In order to maximise the dust suppression properties of the surface of particulate material it may be necessary to repeat spraying or rewetting the surface, optionally with the surface being dried in between each application. When dust suppression properties begin to deteriorate they can be restored by the same treatment. The following examples and results illustrate the dust suppression action of the composition of the invention.

The composition used in the process of the invention (A) is prepared by mixing nonaqueous dispersions of an anionic polymer and a cationic polymer and comprising 50% by weight of a cationic copolymer of 42% by weight dimethyl aminoethyl acrylate and 58% acrylamide, and 50% by weight of an anionic polymer of 40% sodium acrylate and 60% acrylamide Thus the mole percent of anionic to cationic polymer in the composition is 66% to 33%.

Composition B is a known type of dust suppressant, comprising polyacrylamide as detailed in U.S. Pat. Nos. 3,677,014 and 4,417,992.

The efficacy of these two dust suppressants was evaluated by the following test procedure:

A 20 g sample of road dust was taken in a beaker. 2.9 cm$^3$ of 0.5% active dust suppressant solution was added and thoroughly mixed in with a spatula. The sample was then transferred to a 1.5 in pellet die and pressed at $1.38 \times 10^6 Nm^{-2}$ (200 psi) for 60 seconds. The pellet was then allowed to dry for 48 hours at room temperature.

The dry pellet was then placed in a 100 cm$^2$ plastic tub and tumbled on a rotating wheel. At 1 minute intervals the pellet was removed and weighed to determine the amount of material remaining in pellet form. The results are recorded in Table 1.

The test was repeated using a 1% active dust suppressant solution and the results are shown in Table 2.

TABLE 1

| | 0.5% active solution | |
| --- | --- | --- |
| | % Dust Remaining in Pelletised Form | |
| PRODUCT | 60 sec | 120 sec |
| A | 85.6 | 73.8 |
| B | 69.2 | 53.0 |

TABLE 2

| | 1.0% active solution | | | |
| --- | --- | --- | --- | --- |
| | % Dust Remaining in Pelletised Form | | | |
| PRODUCT | 120 sec | 240 sec | 540 sec | 840 sec |
| A | 65.7 | 50.4 | 30.8 | 19.5 |
| B | 38.8 | 25.7 | 10.1 | 6.0 |

From these results it can be seen that the product of the invention gives superior performance to the known dust suppressant giving stronger initial binding and having longer effective life.

We claim:

1. A method for the stabilisation of a surface of finely divided particulate material by mixing (a) particles of anionic, water-soluble polymer dispersed in a non-aqueous liquid, with
(b) particles of cationic, water-soluble polymer dispersed in a non-aqueous liquid, and
(c) water to provide a solution of 10 to 40 or 60 to 90 mole % of anionic polymer and 90 to 60 or 40 to 10 mole % of cationic polymer, and then immediately applying the solution to the surface.

2. A method according to claim 1 in which the cationic and anionic polymers are mixed together in the absence of water and the mixture is then combined with the water.

3. A method according to claim 1 in which one polymer has a molecular weight in the range 1,000,000 to 20,000,000.

4. A process according to claim 1 in which both of the polymers are formed ethylenically unsaturated monomers.

5. A method according to claim 1 in which the anionic polymer is formed from 50 to 100% by weight water-soluble ethylenically unsaturated anionic monomer with up to 50% non-ionic co-monomer.

6. A method according to claim 5 in which the anionic monomer is selected from the group consisting of sulphonic acid and carboxylic acid monomers.

7. A method according to claim 6 in which the anionic monomer is acrylic acid.

8. A method according to claim 1 in which the cationic polymer is formed from ethylenically unsaturated monomers including cationic monomer selected from the group consisting of dialkyl amino alkyl derivatives of (meth)acrylamide and (meth)acrylic acid.

9. A method according to claim 8 in which the cationic monomer residues are quaternised.

10. A method according to claim 1 in which the anionic polymer is present in an amount in the range 60 to 90 mole % and the cationic polymer is present in an amount in the range 40 to 10 mole % of total polymer.

11. A method according to claim 1 in which the solution is sprayed onto the surface.

12. A method according to claim 1 in which the solution is applied at a rate in the range 5 to 100 g dry polymer per $m^2$ surface.

13. A method according to claim 12 in which the said surface is the surface of particulate material undergoing transportation.

14. A method according to claim 1 in which the surface to which the solution is applied is carried by a transportation means.

15. A method according to claim 11 in which the solution is applied at a rate in the range 5 to 100 g dry polymer per $m^2$ surface.

16. A method according to claim 1 in which both polymers have a molecular weight in the range 1,000,000 to 20,000,000.

* * * * *